United States Patent
Iguchi

(10) Patent No.: US 10,129,389 B2
(45) Date of Patent: Nov. 13, 2018

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Junji Iguchi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/226,424

(22) Filed: Aug. 2, 2016

(65) Prior Publication Data
US 2017/0041456 A1    Feb. 9, 2017

(30) Foreign Application Priority Data

Aug. 7, 2015    (JP) .................................. 2015-157526

(51) Int. Cl.
*H04M 11/00* (2006.01)
*H04M 1/74* (2006.01)
*H04M 3/22* (2006.01)
*H04N 1/00* (2006.01)

(52) U.S. Cl.
CPC ......... *H04M 1/745* (2013.01); *H04M 3/2209* (2013.01); *H04N 1/0001* (2013.01); *H04N 1/00037* (2013.01); *H04N 1/00076* (2013.01); *H04N 1/00206* (2013.01); *H04M 2201/52* (2013.01); *H04N 2201/0094* (2013.01)

(58) Field of Classification Search
USPC ............................. 379/93.05, 100.01, 100.06
See application file for complete search history.

(56) References Cited

U.S. PATENT DOCUMENTS

| | | | | |
|---|---|---|---|---|
| 2003/0031611 A1* | 2/2003 | Choi | ........................ | C01G 9/02 |
| | | | | 423/101 |
| 2005/0031098 A1* | 2/2005 | Ito | ........................ | H04M 1/82 |
| | | | | 379/100.01 |
| 2007/0041543 A1* | 2/2007 | Kabeya | .............. | H04N 1/32765 |
| | | | | 379/157 |
| 2009/0080625 A1* | 3/2009 | Ogawa | .................... | H04M 1/82 |
| | | | | 379/90.01 |
| 2012/0194856 A1* | 8/2012 | Koizumi | ............ | H04N 1/32717 |
| | | | | 358/1.15 |
| 2013/0083910 A1* | 4/2013 | Baba | .................... | H04M 11/007 |
| | | | | 379/100.01 |

FOREIGN PATENT DOCUMENTS

JP    H07-288605 A    10/1995

* cited by examiner

*Primary Examiner* — Quoc D Tran
(74) *Attorney, Agent, or Firm* — Canon U.S.A., Inc. IP Divison

(57) ABSTRACT

There is provided a method for capturing a line after an elapse of a predetermined time, in a case where the line has been disconnected caused by an occurrence of a specific event in which a heavy load signal is input to an input side connecting the line. The control method for controlling a communication apparatus configured to perform a data communication via a line, includes detecting a signal on the line, disconnecting the line based on a level of the detected signal, and capturing the line based on an elapse of a predetermined time after the line has been disconnected.

7 Claims, 7 Drawing Sheets

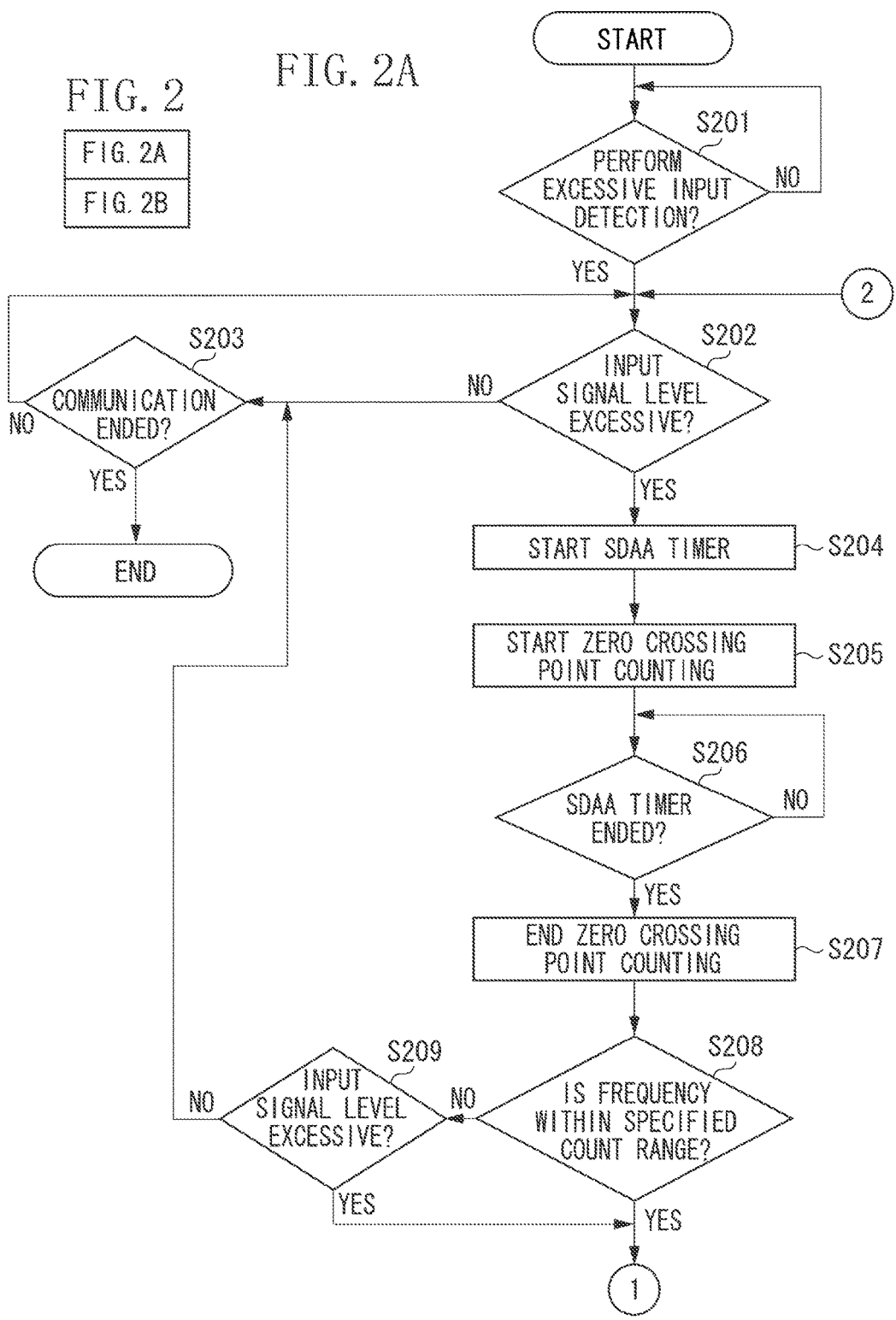

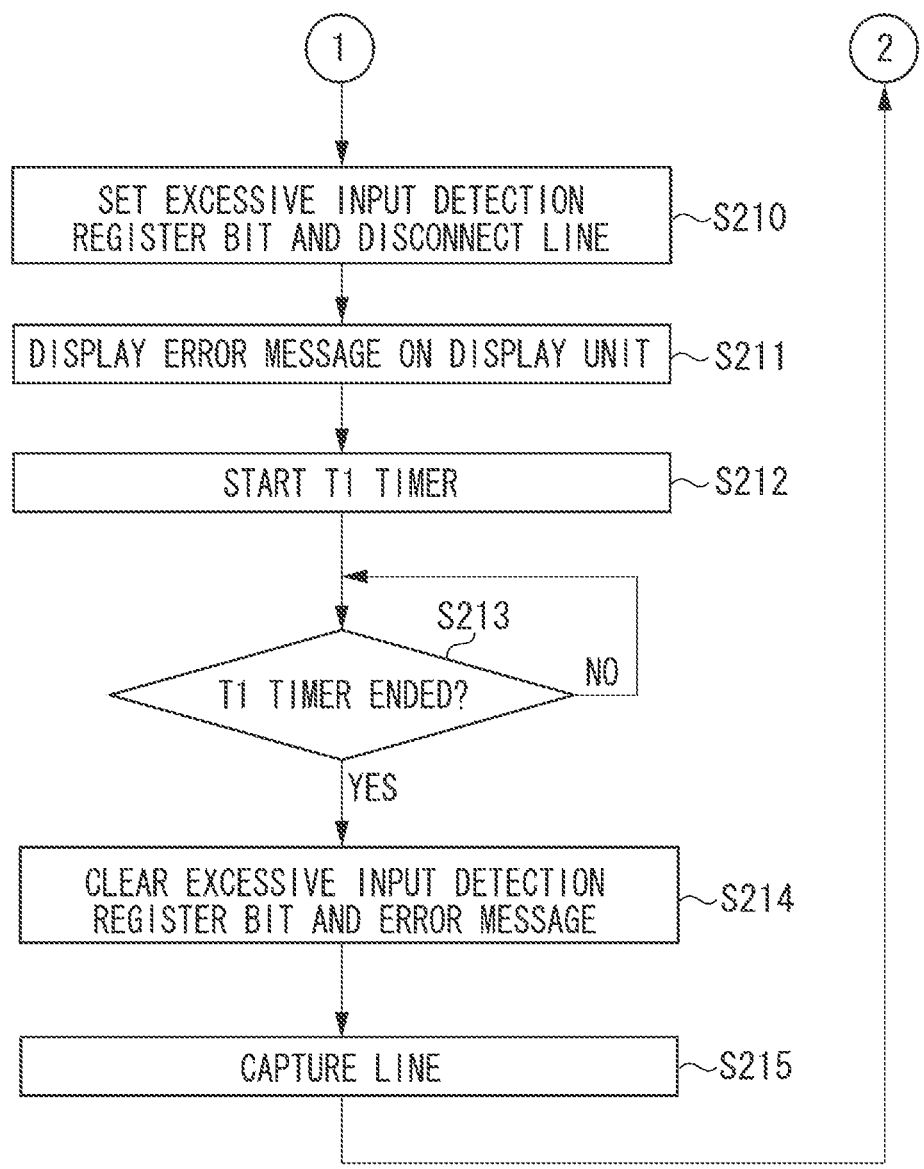

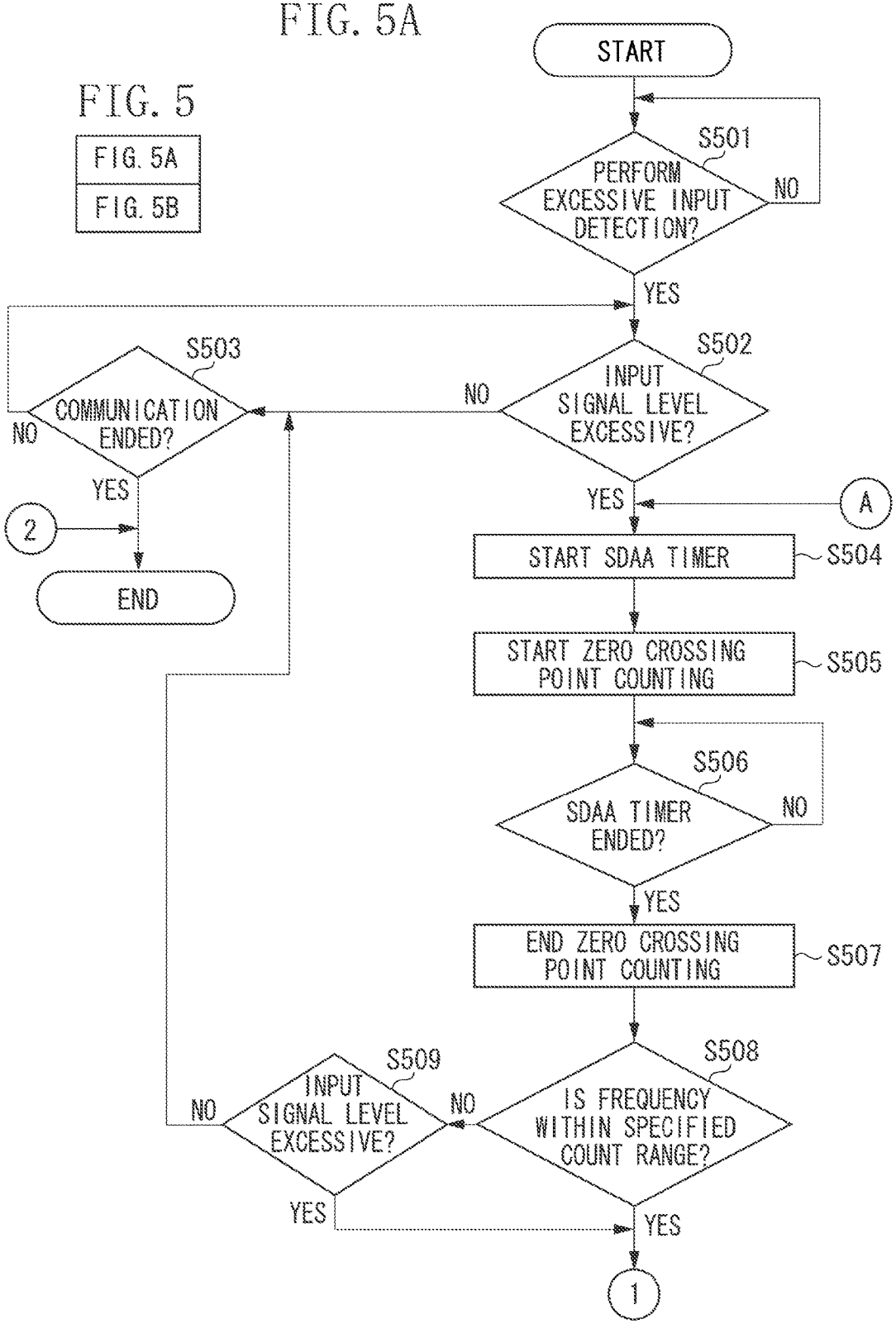

COMMUNICATION APPARATUS, CONTROL METHOD FOR COMMUNICATION APPARATUS, AND STORAGE MEDIUM

BACKGROUND OF THE INVENTION

Field of the Invention

The present disclosure generally relates to communications and, more particularly, to a communication apparatus, a control method for the communication apparatus, and a storage medium.

Description of the Related Art

Recently, communication apparatuses such as multifunction peripherals (MFPs) that include a facsimile function, a copy function, a scan function, and a print function therein have been widely known and used, and even at home used. There may be a case where a telephone line and a commercial power supply contact and are connected to each other by accident. Such mixture of the commercial power supply into the telephone line causes circuits in a multifunction peripheral connected thereto to be damaged and also causes a communication breakdown state.

Conventionally, to protect apparatuses connected to the telephone line, there have been a protection method in which an excessive electric line current is detected to control a relay, connecting the telephone line and the interface circuit, to open as discussed in Japanese Patent Application Laid-open No. 7-288605.

However, according to the conventional technique, because an overcurrent detection time and a relay operation time are required before starting circuit protection, the response to the overcurrent becomes slow. Therefore, sometimes the circuit protection is not sufficient for a large input.

In addition, there is a technique for detecting excessive voltage or excessive current in the line to disconnect the line and maintain that state, for example, by using a fuse or other devices.

However, for such events, a user has to do work operation such as replacement work by himself/herself, and generally, it is difficult for the user to find the cause of trouble. Therefore, it is difficult to deal with the trouble quickly. Further, after such a trouble has occurred, it is sometimes difficult to cause the communication function of a facsimile apparatus to function normally.

SUMMARY OF THE INVENTION

According to an aspect of the present disclosure, a communication apparatus configured to perform data communication via a communication line, includes a detection unit configured to detect a signal on the communication line, and a communication line control unit configured to disconnect the communication line based on a level of the signal detected by the detection unit, wherein the communication line control unit captures the communication line based on an elapse of a predetermined time after the communication line is disconnected.

Further features of the present disclosure will become apparent from the following description of exemplary embodiments with reference to the attached drawings.

BRIEF DESCRIPTION OF THE DRAWINGS

FIG. 2, which includes FIGS. 2A and 2B, is a flowchart illustrating a control method for the communication apparatus.

FIG. 5, which includes FIGS. 5A and 5B, is a flowchart illustrating a control method for a communication apparatus.

DESCRIPTION OF THE EMBODIMENTS

Exemplary embodiments of the present disclosure will be described with reference to the drawings.

<System Configuration>

Figure 1:
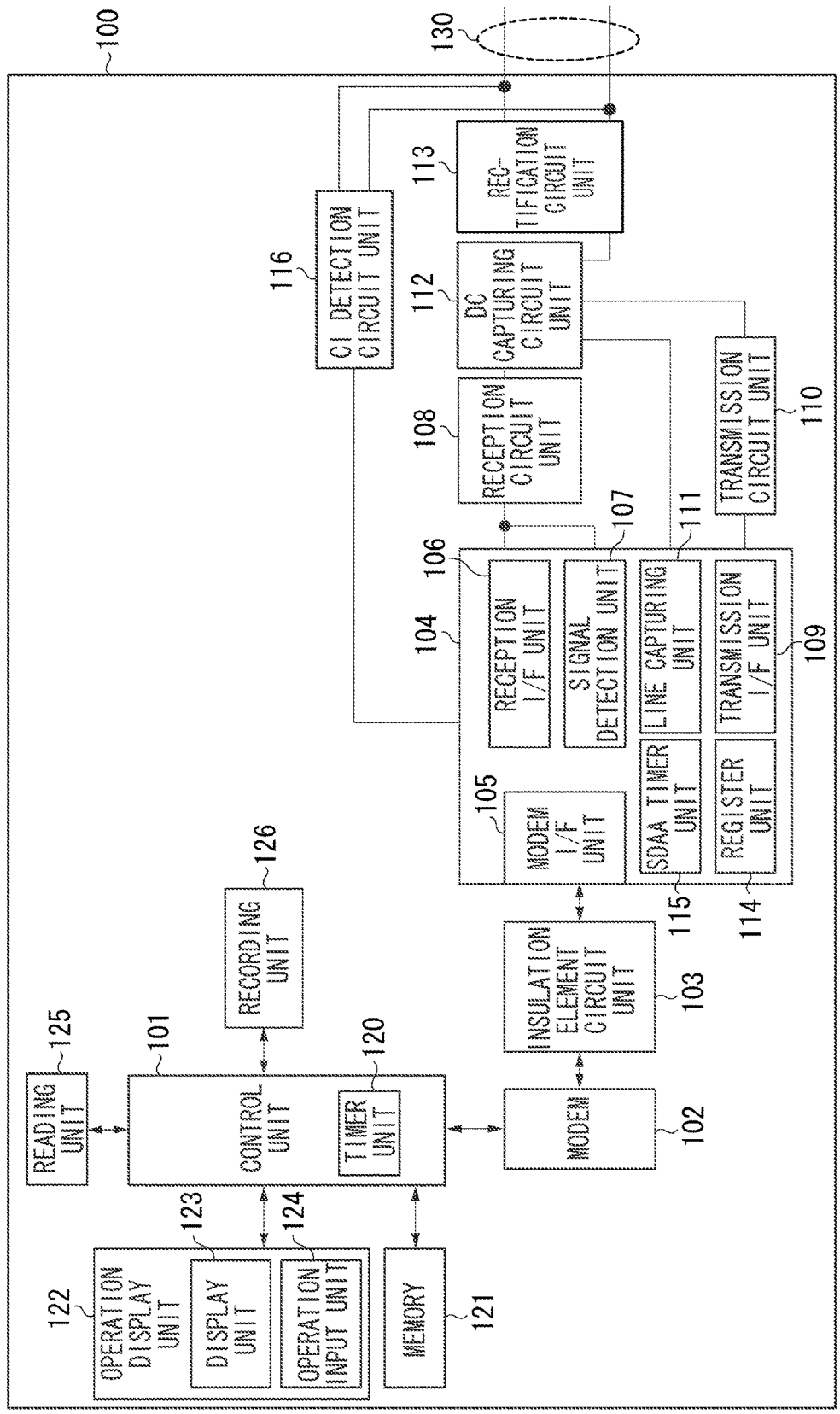
FIG. 1 is a block diagram illustrating a configuration of a communication apparatus.

FIG. 1 is a block diagram illustrating a configuration of a communication apparatus according to a first exemplary embodiment of the present disclosure. In this example, a facsimile apparatus is connected to a communication line to perform facsimile communication.

In FIG. 1, a control unit 101, which may include one or more processors and one or more memories, controls an entire image forming apparatus 100. A modulation and demodulation unit (modem) 102 communicates with the control unit 101 to exchange image data and/or other data for facsimile communications. An insulation element circuit unit 103 connected to the modem 102 is a circuit unit for insulating a telephone line 130 and the image forming apparatus 100. As used herein, the term "unit" generally refers to any combination of hardware, firmware, software or other component, such as circuitry, that is used to effectuate a purpose.

A Silicon DataAccess Arrangement (SDAA) 104 called Data Access Arrangement is connected to the telephone line 130 side of the insulation element circuit unit 103. The SDAA 104 controls circuits of the telephone line side, captures and disconnects the telephone line 130, and transmits and receives data under control of the control unit 101 and the modem 102.

The SDAA 104 communicates with the modem 102 via a modem interface (I/F) unit 105 to transmit and receive data and commands. A reception I/F unit 106 receives alternating current (AC) signals on the telephone line 130. A signal detection unit 107 detects zero crossing of a signal on the telephone line 130.

Further, the signal detection unit 107 also detects the voltage level of the signal on the telephone line 130 to check whether the voltage level of the signal is an excessive input. The signal detection unit 107 includes an analog-to-digital (AD) converter therein, and can detect a communication AC signal level on the telephone line 130 to an accuracy of mV order. Further, internal values of the signal detection unit 107 is set so as to be able to detect this mV order AC signal when the signal detection unit 107 captures the telephone line 130.

On the other hand, when the commercial power supply contacts and mixed with the telephone line 130, the input signal has a level of several hundred voltage order. Thus, the AD converter in the signal detection unit 107 operating with a setting in capturing the telephone line 130 outputs the maximum value.

Based on the difference therebetween, the signal detection unit 107 can discriminate the signal levels of communications at an abnormal state and a normal state. A reception circuit unit 108 is a circuit for receiving signals on the telephone line 130 to output them to the modem I/F unit 105 and the signal detection unit 107.

This circuit uses a capacitor to only output AC components of the signals on the telephone line 130 to the reception I/F unit 106 and the signal detection unit 107. A transmission I/F unit 109 is a circuit unit for outputting transmission signals onto the telephone line 130.

A line capturing unit 111 output a signal for capturing the telephone line 130. Upon receiving the signal, a direct current (DC) capturing circuit unit 112 performs capturing and cutting of the telephone line 130. A rectification circuit unit 113 is a circuit for supplying power to the SDAA 104, the DC capturing circuit unit 112, and other components, regardless of the polarity of the telephone line 130.

A register unit 114 holds setting values of the SDAA 104 and the measurement values of various units in the SDAA 104. These values can be read from and written into register unit 114 from the control unit 101 via the modem 102 and the modem I/F unit 105. A SDAA timer unit 115 is a timer used for measuring time for each unit in the SDAA 104. A calling (CI) detection circuit unit 116 is a circuit for detecting calling signals from the telephone line 130.

A timer unit 120 in the control unit 101 controls a timer by the control of the control unit 101. A memory 121 stores control programs for controlling the image forming apparatus 100 and user data. Further, the memory 121 temporarily stores image data. An operation display unit 122 is controlled by the control unit 101 to display the state, the information, and the like of the image forming apparatus 100. Further, the operation display unit 122 receives a user input, and input it into the control unit 101. A display unit 123 in the operation display unit 122 displays the state, the information, and the like of the image forming apparatus 100. An operation input unit 124 includes keys, a touch panel, and/or other devices used for inputting user's operations.

A reading unit 125 reads documents and sends the image data of the read documents to the control unit 101. A recording unit 126 is controlled by the control unit 101 to record the documents read by the reading unit 125, images received by a facsimile apparatus, and the like. In the present exemplary embodiment, for example, an ink-jet method and an electrophotographic method can be applied to the engine of the recording unit 126.

FIG. 2, which includes FIGS. 2A and 2B, is a flowchart illustrating a control method for a communication apparatus according to the present exemplary embodiment. This example includes a series of processing of the line disconnection and the line capturing of the image forming apparatus 100 illustrated in FIG. 1. In addition, each step is realized by the control unit 101 executing the stored control programs.

First, in step S201, after the image forming apparatus 100 has captured the telephone line 130 for communications, the control unit 101 refers to the setting data stored in the memory 121, and determines whether to perform excessive input detection. When the telephone line 130 is captured, the control unit 101 drives the line capturing unit 111 in the SDAA 104 via the modem 102 and the modem I/F unit 105.

The line capturing unit 111 controls the DC capturing circuit unit 112 to capture the telephone line 130 in a DC capturing manner via the rectification circuit unit 113. In step S201, if the excessive input detection is performed (YES in step S201), the processing proceeds to step S202. In step S202, the signal detection unit 107 in the SDAA 104 determines whether the input signal level of the AC signal on the telephone line 130 is excessive compared with the level of a normal facsimile signal. At that time, the control unit 101 monitors the signal detection unit 107 via the modem 102, the insulation element circuit unit 103, and the modem I/F unit 105 in the SDAA 104.

Then, if the signal detection unit 107 determines that the input signal level is not excessive (NO in step S202), the processing proceeds to step S203.

In step S203, the control unit 101 determines whether to end the communication. If the control unit 101 determines that the communication is to be ended (YES in step S203), the control unit 101 controls the DC capturing circuit unit 112 in the SDAA 104 via the modem 102 to stop capturing the telephone line 130, i.e., to disconnect the line. Then, this processing is terminated. On the other hand, if the control unit 101 determines not to end the communication (NO in step S203), the processing returns to step S202 to keep checking the input level until the end of the processing.

On the other hand, in step S202, if the signal detection unit 107 determines that the input level is excessive (YES in step S202), the processing proceeds to step S204. In step S204, the signal detection unit 107 starts timer using the SDAA timer unit 115 to check the frequency. Then, the processing ends.

Figure 3:
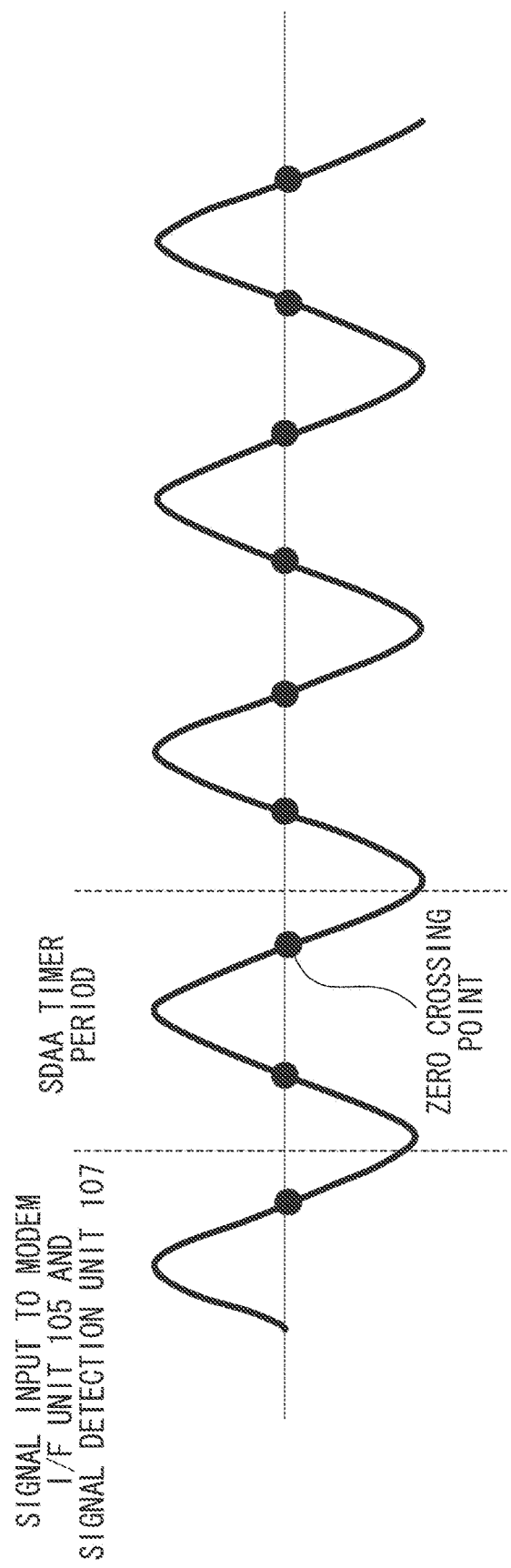
FIG. 3 is a characteristic diagram illustrating an operation of the communication apparatus illustrated in FIG. 1.

FIG. 3 is a characteristic diagram illustrating the frequency checking processing by the signal detection unit 107 illustrated in FIG. 1. Hereinbelow, line control is described in which the high-voltage signal overlapped on the telephone line 130 is detected to switch between the disconnection and capturing of the telephone line 130 and the SDAA 104 with reference to FIG. 3.

In FIG. 3, black circles indicate zero crossing points of the signal input to the signal detection unit 107. The frequency is detected based on the number of zero crossing points in a timer period of the SDAA timer unit 115.

In step S205, the signal detection unit 107 start counting the zero crossing points of the input signal. In step S206, the signal detection unit 107 waits for the end of the SDAA timer unit 115. If the SDAA timer unit 115 is ended (YES in step S206), the processing proceeds to step S207. Then, in step S207, the counting of the zero crossing points ends. The frequency of the input signal is detected based on the zero crossing points count value and the time measured by the SDAA timer unit 115.

More specifically, the frequency can be detected as follows in a case where the SDAA timer period is 20 ms and two zero crossing points are includes therebetween as illustrated in FIG. 3.

$$2/((0.020)*2)=50 \text{ Hz}$$

As another example, if there are four zero crossing points, the frequency can be calculated as follows.

$$4/((0.020)*2)=100 \text{ Hz}$$

In step S208, the signal detection unit 107 determines whether the frequency is within the count specified range, according to the setting value set in the register unit 114. In the present exemplary embodiment, taking into the contact and the mixture of the commercial power supply and the telephone line 130, the frequency specified range is assumed to be, for example, from 50 Hz to 100 Hz.

If the signal detection unit 107 determines that the frequency is out of the specified range (NO in step S208), the processing proceeds to step S209. In step S209, the signal detection unit 107 determines whether the input signal is excessive. If the signal detection unit 107 determines that the input signal is not excessive (NO in step S209), the processing proceeds to step 203. In this case, it indicates that a short time excessive input has occurred, and it wouldn't cause the parts (e.g., the DC capturing circuit unit 112, the reception circuit unit 108, a transmission circuit unit 110, and the rectification circuit unit 113) to break down.

On the other hand, in step S209, if the signal detection unit 107 determines that the input signal is excessive (YES in step S209), the processing proceeds to step S210. In step S210, the signal detection unit 107 sets a bit of the register unit 114 for indicating the excessive input. With this setting, the line capturing unit 111 controls the DC capturing circuit unit 112 to operate to disconnect the telephone line 130.

Figure 4:
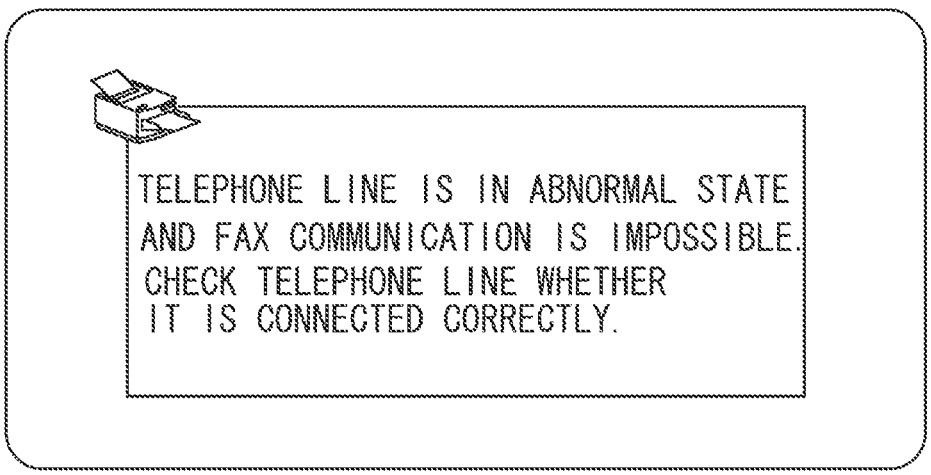
FIG. 4 is a diagram illustrating a user interface (UI) screen displayed on the communication apparatus.

In step S211, the control unit 101 monitors the register unit 114 in the SDAA 104, and if it is determined that the input signal is excessive, the control unit 101 controls the operation display unit 122 to display an error message, for example, as illustrated in FIG. 4 on the display unit 123.

In step S212, the control unit 101 start T1 timer using the timer unit 120. In step S213, the control unit 101 waits for the end of the T1 timer. In step S213, after the end of T1 timer (YES in step S213), the processing proceeds to step S214. In step S214, the control unit 101 clears the excessive input detection bit in the register unit 114 of the SDAA 104 via the modem 102 and the modem I/F unit 105. At the same time, the control unit 101 clears the error message displayed on the display unit 123. In the present exemplary embodiment, the excessive input detection bit includes a value indicating a state where a specific high voltage signal is input, and used to detect the state in which the value is changed. Based on the excessive input detection bit, the SDAA 104 disconnects the telephone line 130, after a predetermined time has elapsed, the SDAA 104 captures the telephone line 130, to automatically recover the state to an incoming call wait state.

In step S215, the control unit 101 operates the line capturing unit 111 in the SDAA 104 to cause the DC capturing circuit unit 112 to capture the telephone line 130 again. Then, the processing returns to step S202, to check the state of the telephone line 130 by the signal detection unit 107.

According to the present exemplary embodiment, if the excessive input to the telephone line 130 is detected, the connection to the telephone line 130 can be cut at once, and after a predetermined time (T1 in the present exemplary embodiment), the state of the telephone line 130 can be checked again.

Therefore, the state where telephone line 130 is disconnected does not kept continuously. Further, since a message is displayed on the display unit 123, the user can recognize the reason of the communication breakdown, thereby enhancing the usability.

In the present exemplary embodiment, the description has been given of the case of high voltage, but the similar effects can be obtained in a case of high current. Further, the present disclosure can be applied to facsimile apparatuses, data communication apparatuses, and other communication apparatuses. In these cases also, similar effects can be obtained.

Figure 5B:
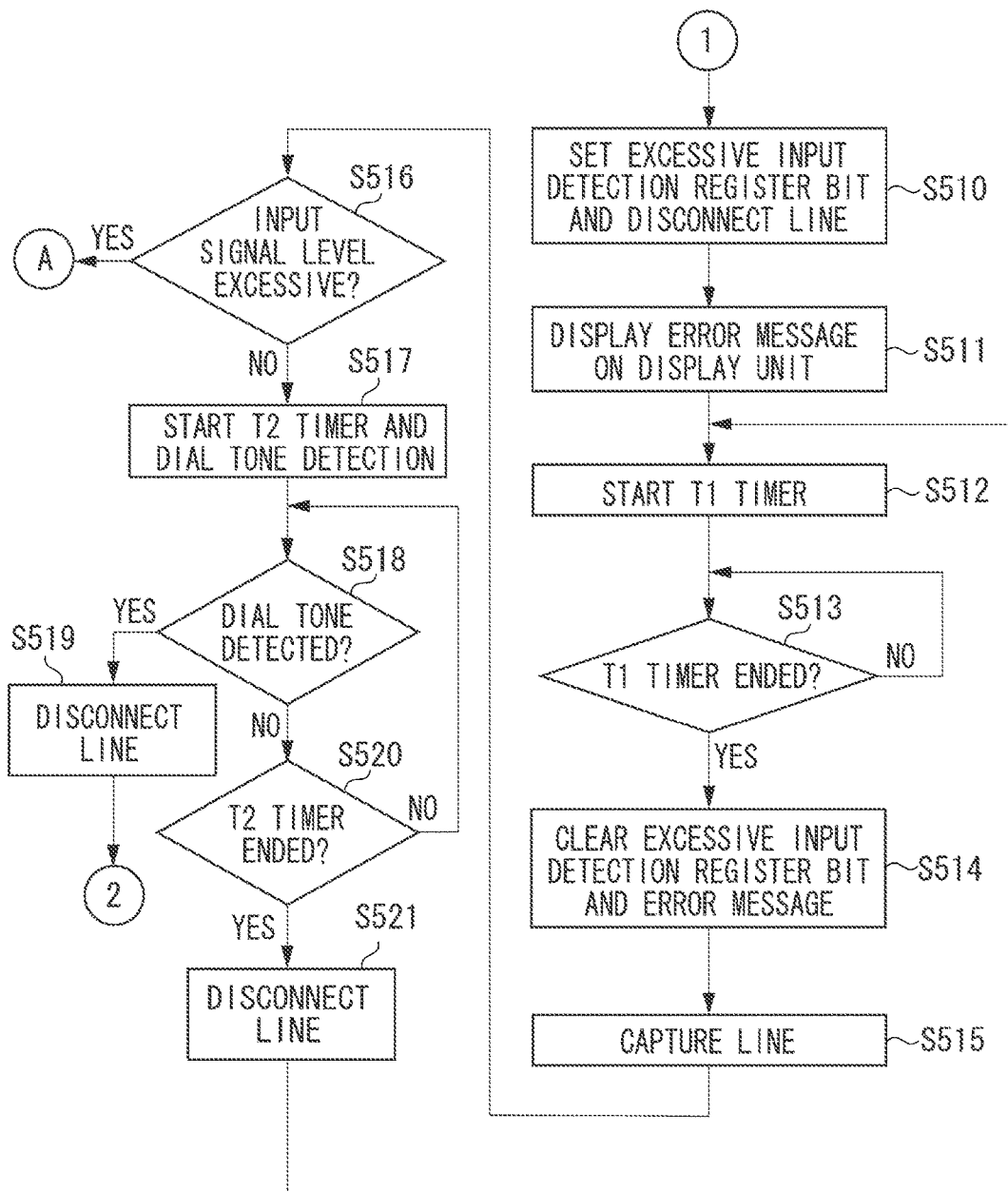

FIG. 5, which includes FIGS. 5A and 5B, is a flowchart illustrating a control method for controlling a communication apparatus according to a second exemplary embodiment. This example method is a series of processing including line disconnection and line capturing of the image forming apparatus 100 illustrated in FIG. 1. The processing from step S501 to step S515 is similar to that from step S201 to step S215 illustrated in FIG. 2. Therefore, the description thereof is omitted. Each step is realized by the control unit 101 executing stored control programs.

In step S516, after the capturing of the telephone line 130, the signal detection unit 107 checks whether the input signal level is excessive. Then, if the signal detection unit 107 determines that the input signal level is excessive (YES in step S516), the processing proceeds to step S504.

On the other hand, in step S516, if the signal detection unit 107 determines that the input signal level is not excessive (NO in step S516), the processing proceeds to step S517. In step S517, the control unit 101 start T2 timer in the timer unit 120. Further, at the same time, the control unit 101 controls the modem 102 and the SDAA 104 to start checking whether the input signal is a dial tone using the reception I/F unit 106.

In step S518, if the dial tone is detected (YES in step S518), the control unit 101 determines that the telephone line 130 is recovered to a normal state, and the processing proceeds to step S519. In step S519, the control unit 101 disconnects the line, and the image forming apparatus 100 shifts to the standby state. Then, the processing ends.

In step S518, if the dial tone, which is a predetermined tone signal, is not detected (NO in step S518), the processing proceeds to step S520. In step S520, the control unit 101 determines whether the T2 timer ends. If it is determined that the T2 timer ends (YES in step S520), the processing proceeds to step S521. In step S521, the control unit 101 disconnects the telephone line 130, and then, the processing returns to step S512.

According to the present exemplary embodiment, after the occurrence of the touch and mixed state of the commercial power supply and the telephone line 130, the telephone line 130 is captured to detect the dial tone, thereby enabling the determination of whether the telephone line 130 has returned to a normal state (i.e., communicatable state) more correctly.

The present disclosure can be also realized by processing of providing a program that can implement one or more functions described in the above-described exemplary embodiments to a system or an apparatus via a network or a storage medium and then, reading and executing the program by one or more processors and one or more memories in a computer of the system or the apparatus. Further, the present disclosure can be realized by a circuit (e.g., application specific integrated circuits (ASIC)) that can implement one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuit (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuit to perform the functions of one or more of the above-described embodiment(s). The computer may comprise one or more processors and one or more memories (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-157526, filed Aug. 7, 2015, which is hereby incorporated by reference herein in its entirety.

What is claimed is:

1. A communication apparatus configured to perform data communication via a line, the communication apparatus comprising:
  a detection unit configured to detect a signal on the line, determine a input signal level of the signal, and determine a frequency of the signal; and
  a line control unit configured to disconnect the line based on the input signal level and the frequency of the signal detected by the detection unit,
  wherein the line control unit captures the line based on an elapse of a predetermined time after the line is disconnected.

2. The communication apparatus according to claim 1, further comprising a display unit configured to display, in a case where the line has been disconnected, a message indicating that the communication apparatus is not able to perform communication.

3. The communication apparatus according to claim 2, wherein the display unit stops displaying the message, in a case where the line control unit captures the line.

4. The communication apparatus according to claim 1, further comprising a determination unit configured to determine, after the line control unit has captured the line, whether the detection unit has detected a predetermined tone signal,
  wherein the line control unit disconnects the line, in a case where the determination unit determines that the detection unit has detected the predetermined tone signal.

5. The communication apparatus according to claim 1, further comprising a measurement unit configured to measure the predetermined time,
  wherein the line control unit captures the line, in a case where the measurement unit has measured the predetermined time after the line has been disconnected.

6. A control method for controlling a communication apparatus configured to perform a data communication via a line, the method comprising:
  detecting a signal on the line;
  determining a input signal level of the signal;
  determining a frequency of the signal;
  disconnecting the line based on the input signal level and the frequency of the detected signal; and
  capturing the line based on an elapse of a predetermined time after the line has been disconnected.

7. A non-transitory computer readable storage medium storing a program for causing a computer to execute a control method to control a communication apparatus to perform data communication via a line, the control method comprising:
  detecting a signal on the line;
  determining a input signal level of the signal;
  determining a frequency of the signal;
  disconnecting the line based on the input signal level and the frequency of the detected signal; and
  capturing the line based on an elapse of a predetermined time after the line has been disconnected.

* * * * *